United States Patent [19]

Thomas

[11] Patent Number: 4,790,206
[45] Date of Patent: Dec. 13, 1988

[54] LOST MOTION LINK

[75] Inventor: Robert M. Thomas, South Lyon, Mich.

[73] Assignee: American Motors Corporation, Southfield, Mich.

[21] Appl. No.: 129,857

[22] Filed: Dec. 4, 1987

Related U.S. Application Data

[63] Continuation of Ser. No. 817,140, Jan. 8, 1986, abandoned.

[51] Int. Cl.[4] .............................................. F16C 1/10
[52] U.S. Cl. .................... 74/502.4; 74/500.5; 74/501.6; 24/669
[58] Field of Search ............. 74/501 R, 501 A, 501 F, 74/501 D, 523, 524, 519; 24/669, 702

[56] References Cited

U.S. PATENT DOCUMENTS

| | | | |
|---|---|---|---|
| Re. 31,956 | 7/1985 | Deck | 74/501 R |
| 1,172,703 | 2/1916 | Grooms | 24/669 |
| 1,916,896 | 7/1933 | Sneed | 74/501 A |
| 1,423,590 | 7/1922 | Zimmerman | 24/669 |
| 1,527,258 | 2/1925 | Lieberman | 74/501 A |
| 2,195,400 | 4/1940 | Arens | 74/501 A |
| 2,921,481 | 1/1960 | Phelan | 74/501 R |
| 3,016,758 | 1/1962 | Keller | 74/501 A |
| 3,196,706 | 7/1965 | Sevrence | 74/501 R |
| 3,205,727 | 9/1965 | Sevrence | 74/501 R |
| 3,847,034 | 11/1974 | Hemens | 74/501 R |
| 3,878,589 | 4/1975 | Schaefer | 24/669 |
| 3,889,625 | 6/1975 | Roller et al. | 74/501 F |
| 4,175,450 | 11/1979 | Bennett | 74/501 D |
| 4,188,145 | 2/1980 | Poling | 24/702 |
| 4,281,252 | 7/1981 | Parsons et al. | 74/501 R |
| 4,327,600 | 5/1982 | Bennett | 74/501 R |
| 4,407,167 | 10/1983 | Koukal et al. | 74/501 F |
| 4,535,646 | 8/1985 | Kohler | 74/501 R |
| 4,581,953 | 4/1986 | Walston et al. | 74/501 R |
| 4,590,819 | 5/1986 | Spease et al. | 74/501 R |
| 4,694,705 | 9/1987 | Frankhouse et al. | 74/501 R |

Primary Examiner—Richard E. Moore
Assistant Examiner—Vinh Luong
Attorney, Agent, or Firm—Brooks & Kushman

[57] ABSTRACT

A lost motion link for allowing selective control of the throttle valve of a vehicle engine between accelerator pedal linkage and speed control system linkage comprises:

an elongated body having an enclosed longitudinal passage dimensioned to receive an enlarged cable terminus, an integral flange for pivotally mounting the body to the throttle valve actuator, and a restricted portion of the longitudinal passage entraining the terminus in the body.

12 Claims, 2 Drawing Sheets

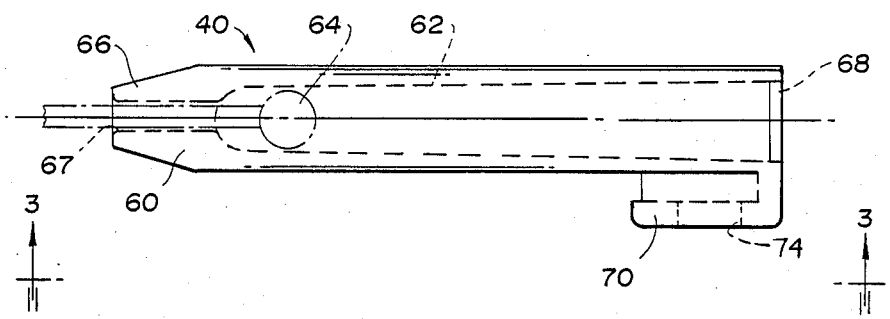
Fig. 2
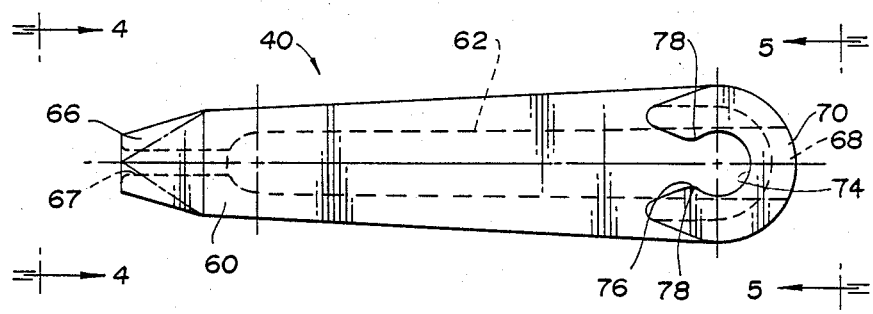
Fig. 3
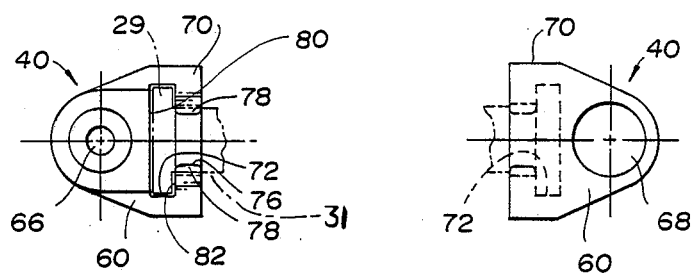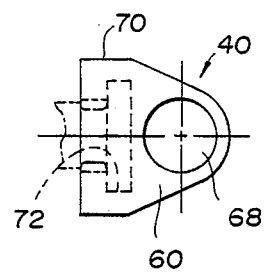
Fig. 4   Fig. 5

LOST MOTION LINK

This is a continuation of co-pending application Ser. No. 817,140 filed on Jan. 8, 1986, now abandoned.

TECHNICAL FIELD

This invention relates to a link mechanism for selectably permitting a lost motion connection between a movable member and shiftable linkage.

BACKGROUND ART

A lost motion connection is a known mechanism technique for permitting selective movement of members.

In the environment of the present invention, the selective lost motion is used to alternately permit an engine throttle valve to be controlled directly by the operator or through an automated speed control system. More specifically, the speed control system can function in an "on" mode or an "off" mode and be selectively coupled or decoupled, respectively, to the throttle valve. In the "on" mode, a direct connection of the speed control linkage is desired. Alternately, in the "off" mode, the throttle valve position is controlled through a direct connection of the accelerator pedal linakage, and movement of the device controlling the throttle valve position (e.g. a bell crank) should not effect corresponding movement of the speed control linkage. Thus, a lost motion connection of the speed control linkage with the throttle valve control member is desired when the vehicle is operated with the speed control system in the "off" mode.

Moreover, a lost motion control linkage for a speed control system is subject to the throttle closing time parameters imposed by Federal Motor Vehicle Safety Standard 124. This regulation required throttle closing to take place within a prescribed time limit through a full range of operating temperatures.

Additionally, the design of the lost motion connection should admit to easy and secure assembly with automobile engines on a mass production basis.

One previously known form of lost motion link for a throttle valve comprises an elongated link having an elongated slot therein. The link is secured at one end of the cable and the elongated slot is sized to loosely recieve a pin extending outwardly from the throttle actuator. The link is entrained on the pin by means of a washer and a locking clip extending through an aperture in the actuator pin. Thus, a plurality of parts must be manufactured and assembled in order to construct the previously known lost motion links used for throttle valves. Moreover, the link is exposed to environmental conditions and can corrode or become clogged and thus depart from the desired operating characteristics.

Another known type of lost motion link comprises a housing defining an elongated chamber adapted to receive an enlarged endbead on one end of a cable. The housing includes an apertured flange adapted to be received on an actuator pin and the flange is entrained on the pin by a washer and a locking pin in the previously known manner. The housing also includes a removable cap section so that the beaded end of the cable can be received in the housing by drawing the cable through the housing so that it protrudes from one end of the housing. The single open end of the housing exposes the bead, chamber and cable to an accumulation of contaminants and corrosive materials such as salt which can enter the engine compartment and thus effect operation of the lost motion linkage. This problem can be especially bothersome when the cable is aligned at an upward angle with respect to the throttle pin.

SUMMARY OF THE PRESENT INVENTION

The present invention is a simple, self-cleaning link mechanism which provides a selective lost motion connection between a speed control cable and a throttle valve control member such as a bell crank.

In the environment of the present invention, the throttle valve control member is provided with first and second input connections. The first connection is a direct connection to the accelerator pedal linkage. The second connection is in parallel with the first and to a speed control cable. The speed control cable is shiftable through a range of positions corresponding to the range of settable cruise speeds.

In the preferred embodiment, the link mechanism takes the form of an elongated, tubular body having an internal longitudinal track for sliding movement of a bead or slug fitted at one end of a control cable. The elongated body preferably includes means for mounting the link to a post on the input end of a bell crank or similar throttle valve control member.

When the speed control is in its "off" mode, and the accelerator pedal in the idle position, the cable is fully extended toward the throttle valve control member and the bead is positioned at one extreme within the internal passage in the link body. As the throttle valve control member is moved through a direct connection with the accelerator pedal linkage, the bead experiences relative sliding movement in the track in lost motion relation to the control member.

Alternately, with the speed control system in its "on" mode, the control cable is retracted to a position corresponding to the selected vehicle speed. This causes the bead to be retracted from the control member and to assume a direct connection with the link to cause corresponding displacement of the throttle valve control member.

In the preferred embodiment the link is of one piece integral molded construction. The link is connected to the throttle valve control member through a raised integral "U-shaped" flange to a conventional, enlarged head post on the control member. This feature facilitates rapid and secure assembly of the link mechanism to the control member, and prevents misalignment and undesirable disorientation of the link during movement of the cable. The longitudinal track formed in the link body is open at the end proximate the control member to permit loading of the bead in the slot to connect the link to the control cable. The other end of the track has a reduced diameter open portion which not only entrains the bead within the body but also acts as a wiper to clean the cable as it is drawn into the body. Preferably, the cable is aligned so that the enlarged opening at the one end of the body is aligned downwardly, whereby motion of the bead in the track expels accumulated deposits of environmental debris outwardly of the housing from the open end near the control member.

These and other features and advantages of the present invention will become apparent in connection with the following detailed description of a preferred embodiment.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which:

FIG. 2 is an enlarged view of the preferred embodiment of the lost motion link mechanism of the present invention;

FIG. 3 is an enlarged side view of the link mechanism of FIG. 3 taken substantially along lines 3—3 in FIG. 2;

FIG. 4 is an end view of the link mechanism taken substantially along lines 4—4 in FIG. 3; and FIG. 5 is another end view of the link mechanism substantially taken along lines 5—5 in FIG. 3.

DETAILED DESCRIPTION OF THE PREFERRED EMBODIMENT

Figure 1:
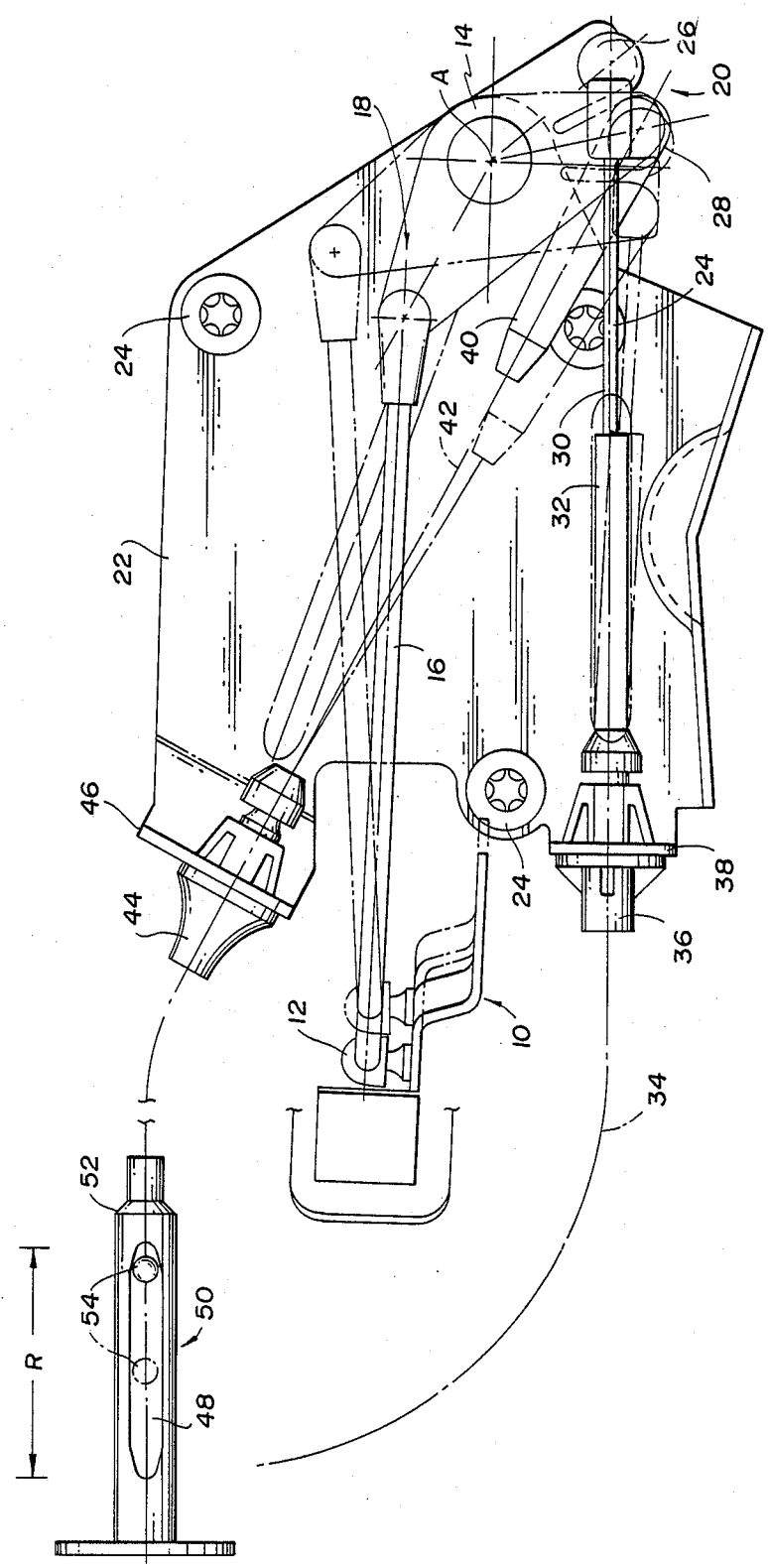
FIG. 1 is a side view of the relevant portion of the throttle valve control linkage illustrating an operating environment of the lost motion link mechanism of the present invention.

FIG. 1 illustrates the portion of the throttle valve linkage of an automobile engine pertinent to an understanding of the present invention.

A throttle lever 10 mounted for corresponding movement with a throttle plate (not shown) is movable through a range of angular positions to regulate the fuel supply to a carbureted internal combustion engine. In the format of FIG. 1, the idle speed condition is shown in the solid line view, and actuation of the throttle lever 10 is shown by the phantom line view. The lever 10 is mounted for pivotal movement about a throttle body axis (not shown).

The throttle lever 10 is mechanically coupled to a bell crank 14 by connection of a link arm 16 which mounts at one lower end 18 of the bell crank 14. The crank 14 is pivotal about an axis A in response to actuation at its other, upper end 20 in a manner to be hereinafter described in greater detail.

The bell crank 14 is mounted for pivotal movement about axis A on an engine mounting bracket 22. The bracket is secured to the engine block or other stationary member by a plurality of fasteners 24.

The upper end 18 of the bell crank 14 is bifurcated into first and second tangs. One tang has an accelerator linkage mounting post 26, and the other tang has a speed control linkage mounting post 28. These linkages provide alternative mechanical input signals to the bell crank 14 to control the angular position of the throttle valve 10.

The accelerator linkage mounting post 26 is connected to one end of a link arm 30. The other end of the arm 30 is connected to a cable guide 32. The cable guide receives one end of an accelerator cable (shown in phantom at 34). The accelerator cable 34 is ultimately connected in conventional fashion to the accelerator pedal (not shown). The accelerator cable 34 passes through a grommet 36 in an integral frame arm 38 of the mounting bracket 22.

The speed control linkage mounting post 28 receives a lost motion link 40 which is a feature of the present invention. The link 40 has a selective lost motion connection to a speed control cable 42. The extension and retraction of the cable 42 is under control of the vehicle speed or "cruise" control system, which is not disclosed herein but is well known in the art. The cable 42 is threaded through a grommet 44 in another integral flange arm 46 of the mounting bracket 22.

The speed control cable 42 terminates at its other end in a controller 50. The controller includes an elongated body 52 with a central axial passage 48. The terminus of the cable 42 is in the form of a slug or bead 45 which can travel over a range of positions "R" between a home position (at right of the controller 50 in FIG. 1) and a fully extended position (at left of the controller 50 in FIG. 1). The home position corresponds to the cruise control system being "off", and movement of the bead 54 from the home position corresponds to a selected cruise velocity.

With reference to FIGS. 2-5, the link 40 is seen to comprise an elongated body 60 preferably formed of molded plastic and having a central passage 62 over the major portion of its axial dimension to accept a cable terminus, such as the bead 64 shown in phantom line in FIG. 2. The bead can travel within the range of the central axial passage 62 in lost motion relation to the link 40. Selection of an appropriate plastic enables the link to be self-lubricating in a well known manner. The passage 62 can be enlarged at end 68, for example, by tapering the peripheral wall of passage 62 as shown in dotted line in FIG. 3.

A cable guide 66 having a reduced diameter bore 67 relative to the passage 62 limits travel of the bead 64 in one direction. In fact, abutment of the bead 64 with the cable guide 66 defines a solid connection of the link 40 to the speed control cable 42. The cable guide 66 also serves to wipe the cable as it enters the body 60.

The other end 68 of the control passage 62 is open to permit loading of the bead 64 in the passage 62. The opening can be larger than the bead so that any salt or other environment debris which can accumulate on the components can be discharged from the opening with movement of the bead 64 in track passage 62. Preferably, as shown in FIG. 1, the flange arm 46 is above the mounting post 28 so that the cable 42 aligns the enlarged opening of the body 60 downwardly.

A mounting flange 70 is formed integrally with the body 60 to mount the link 40 on the speed control linkage mounting post 28. The flange 70 is substantially C-shaped to facilitate rapid and secure mounting of the link 40 on the post 28. More particularly, the substantially C-shaped flange 70 defines an enlarged slot 72 (FIGS. 4 & 5) adapted to receive the enlarged head 29 (shown in phantom line in FIG. 4) of mounting post 28 and a central slot 74 adapted to receive the axial stem 31 of the mounting post 28. The opening 76 of the slot 74 is reduced by inward projections 78 so that the stem becomes rotatably locked within the slot 74. The opening 76 faces the opposite end of the body 60 so that even if flange is incompletely engaged with the mounting post 28 when first installed, abutment of the bead 64 against the guide 66 when the cable 42 is retracted forces proper engagement of the flange 70 with the mounting pin 28.

The operation of the lost motion link 50 is next described with reference to the solid line and phantom line views of FIG. 1 in that order.

In the "off" mode of the speed control system, the bead 54 is in its "home" position in the axial passage 52 of the controller 50. With the throttle valve in its idle position, the bead 64 is at its extreme of travel in the control axial passage 62 in the link 40 and is in abutting relation to the cable guide 66 (see FIG. 3).

Accordingly, movement of the accelerator cable 34 will be transmitted to the bell crank 14 directly, and the link 40 will provide a lost motion connection to the speed control cable 42 as the bead 64 slides freely in the passage 62 away from the displaced cable guide 66.

In the "on" mode of the speed control system, the accelerator cable 34 will be in an "idle" position, and the speed controller 50 will override and control the movement of the bell crank 14. More specifically, movement of the bead 54 in the controller passage 48 away from the home position will cause a direct movement of the link 40 due to the bead 64 being in abutting relation to the cable guide 66.

The link of the present design has been found to meet Federal Motor Vehicle Safety Standard F.M.V.S.S. 124 relating to return to idle speed requirements. Moreover, when the flat head 29 of the mounting pin 28 is entrained between opposite walls of the slots 72 and 74, for example, between 80 and 82 as shown in FIG. 4, the pivoting of the link is limited to substantially a single plane. As a result, the mounting means of the preferred embodiment prevents jamming of the link or disorientation of the link 40 with respect to the bell crank 14 which can adversely affect return time.

The lost motion link of the present invention may be adapted to design variations for particular operating requirements without departing from the scope of the present invention as defined in the appended claims.

What is claimed is:

1. A lost motion assembly for providing a selective lost motion connection with a movable member, comprising:
    a control cable having an enlarged terminus shiftable between a range of positions, and
    a link for selective lost motion connection between said movable member and said control cable, wherein said link comprises an elongated body having integral mounting means for pivotally mounting said body on the movable member, a longitudinal passage through said body dimensioned to receive the terminus of the control cable at one end and permitting free movement of the movable member relative to the cable when the cable is shifted to a selected one extreme of its range of positions, and means on said body for restricting displacement of said terminus within said passage at an opposite end of said passage.

2. The invention as defined in claim 1 wherein the movable member includes a mounting pin; and
    wherein said mounting means comprises a flange defining an open-ended slot adapted to receive said pin.

3. The invention as defined in claim 2 wherein the mounting pin includes an axial stem and an enlarged head at an end of said stem, and wherein said flange includes means for limiting pivotal movement of said body to substantially a single plane perpendicular to the axis of said pin.

4. The invention as defined in claim 1 wherein said means for restricting comprises means for wiping said cable as it is displaced within said body.

5. The invention as defined in claim 1 wherein said restricting means comprises said longitudinal passage having a peripheral wall with reduced diameter portion at said opposite end of said body.

6. The invention as defined in claim 1 wherein said one end of said longitudinal passage includes an enlarged opening.

7. The invention as defined in claim 2 wherein said flange includes means for resiliently restricting the open end of said slot to lockingly entrain said mounting pin in said flange.

8. The invention as defined in claim 7 wherein said means for resiliently restricting comprises inward projections at the open end of said flange.

9. The invention as defined in claim 3 wherein said flange includes a first open-ended slot adapted to receive said enlarged head, a second open-ended slot adjacent said first slot adapted to receive said stem; and
    wherein said flange includes means for resiliently restricting the open end of one of at least one of said first and second slots to lockingly entrain said mounting pin in said flange.

10. The invention as defined in claim 1 wherein said body is made of a synethetic plastic material.

11. The invention as defined in claim 1 wherein said longitudinal passage is defined by a peripheral wall tapering radially outwardly toward said one end.

12. In combination with a throttle valve linkage having an accelerator cable and a speed control cable shiftable through a range of positions for controlling the angular position of the valve and means for coupling each of said cables to a movable valve control member having a range of positions, the improvement comprising:
    an enlarged terminus on the speed control cable; and
    a lost motion link for providing a selective lost motion connection between the movable valve control member and the control cable and wherein said lost motion link comprises:
    an enlongated body having integral mounting means for pivotally mounting said body on the movable member, a longitudinal passage dimensioned to an receiving the terminus of the control cable at one end and permitting free movement of the movable member relative to the cable when the cable is shifted to a selected one extreme of its range of positions, and means for restricting displacement of said terminus within said passage at an end of said passage opposite to said one end.

* * * * *

UNITED STATES PATENT AND TRADEMARK OFFICE
CERTIFICATE OF CORRECTION

PATENT NO. : 4,790,206
DATED : December 13, 1988
INVENTOR(S) : Robert M. Thomas

It is certified that error appears in the above-identified patent and that said Letters Patent is hereby corrected as shown below:

Column 1, line 13, "mechanism" should be --mechanical--.
Column 1, line 23, "linakage" should be --linkage--.
Column 1, line 37, "required" should be --requires--.
Column 1, lines 45-46, "recieve" should be --receive--.
Column 3, line 9, delete "the" and insert --a--.
Column 4, line 7, delete "bead 45" and insert --bead 54--.
Column 5, line 15, "F.M.V.S.S." should be --(F.M.V.S.S.)--.
Column 6, line 29, "synethetic" should be --synthetic--.
Column 6, line 46, "enlongated" should be --elongated--.
Column 6, line 48, "an" should be --and--.

Signed and Sealed this

Fourth Day of July, 1989

Attest:

DONALD J. QUIGG

*Attesting Officer*   Commissioner of Patents and Trademarks